Mar. 13, 1923.
W. L. BROOKE
MOTOR MEAT SAW
Filed Mar. 11, 1922
1,448,188
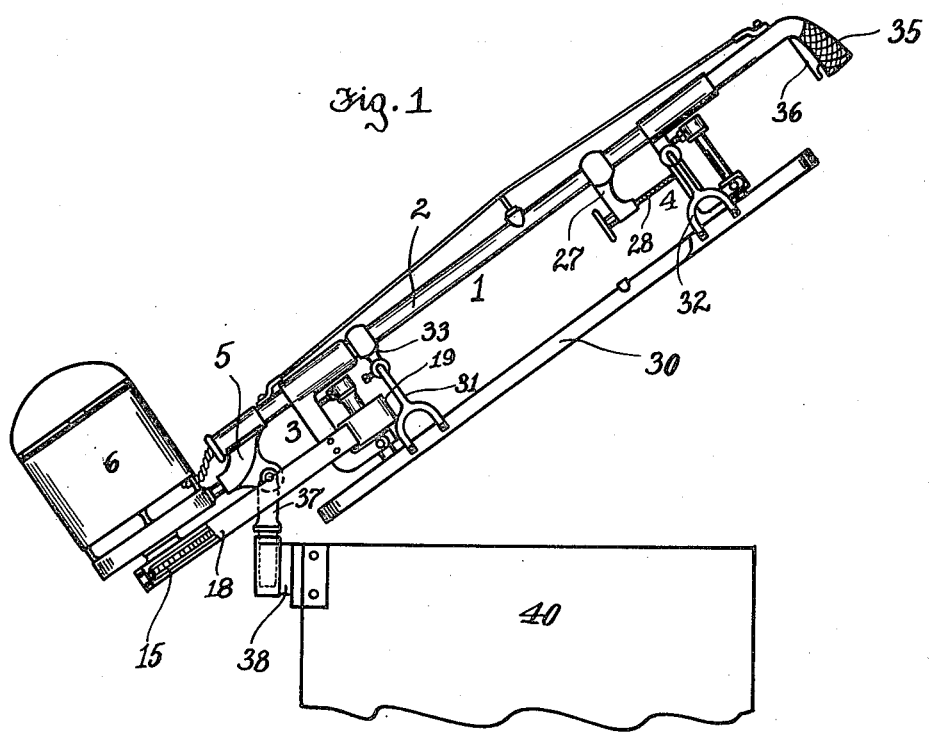
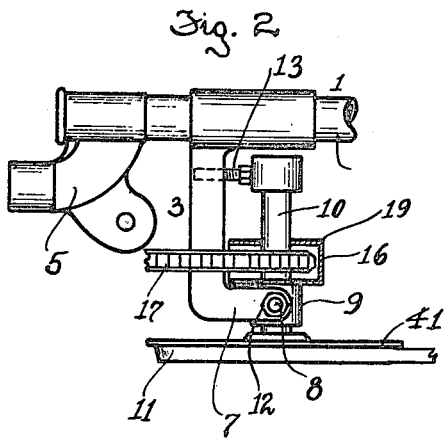
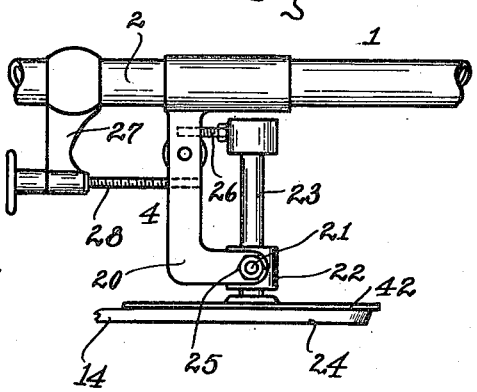
Inventor
WILLIAM L. BROOKE
By Harry C. Schroeder
Attorney Patented Mar. 13, 1923.

1,448,188

UNITED STATES PATENT OFFICE.

WILLIAM L. BROOKE, OF OAKLAND, CALIFORNIA, ASSIGNOR TO KUT KWIK SAW COMPANY, OF OAKLAND, CALIFORNIA, A CORPORATION OF CALIFORNIA.

MOTOR MEAT SAW.

Application filed March 11, 1922. Serial No. 543,045.

*To all whom it may concern:*

Be it known that I, WILLIAM L. BROOKE, a citizen of the United States, residing at Oakland, in the county of Alameda and State of California, have invented certain new and useful Improvements in Motor Meat Saws, of which the following is a specification.

My invention is an improved motor meat saw in which the saw band sprocket at the motor end of the saw is set inwardly from said end so that the saw will not cut the edge of the meat block on which the saw is mounted.

Referring to the drawing forming a part of this specification in which my invention is illustrated:

Figure 1 is a side elevation of my saw.

Figure 2 is a fragmentary side view of the wheel mechanism at the motor end of the saw.

Figure 3 is a fragmentary side view of the wheel mechanism at the swinging end of the saw with the saw housing and hangers removed.

In the drawing 1 indicates a frame which comprises a beam 2, two wheel supports 3 and 4 depending from said beam and a motor support 5 at one end of the frame, the support 3 being fixed on said beam and the support 4 being slidable thereon. A motor 6 is mounted on the support 5. The wheel support 3 is spaced inwardly a short distance from the motor end of the frame 1 and has a horizontal arm 7 at its lower end in which is pivoted by means of trunnion 8 a wheel bearing 9, in which bearing is journaled a wheel shaft 10 which carries on its lower end a band wheel 11. A nut 12 screws on the end of the pivot 8 against the arm 7 for adjustably holding the shaft 10 and wheel 11 at different angles. A set screw 13 is seated in the upper part of the support 3 which is adjusted against the upper end of the shaft 10 to positively limit the angle of said shaft and wheel 11 against the tension of the band saw 14 which extends around the wheel 11. On the lower end of the motor shaft is secured a sprocket 15 and on the shaft 10 above the arm 7 is secured a sprocket 16, which sprockets are engaged by a chain 17. The sprocket 15 and chain 17 to sprocket 16 are enclosed by a housing 18 and the sprocket 16 and the portion of the chain thereon are enclosed by a housing 19. The sprocket support 4 has a horizontal arm 20 at its lower end in which is pivoted, by means of a trunnion 21, a bearing 22, in which bearing is journaled a shaft 23 which carries on its lower end a band wheel 24, over which wheel extends the band saw 14. A nut 25 screws on the end of pivot 21 against the arm 20 for adjustably holding the wheel 24 at the desired angle. A set screw 26 is seated in the upper part of the support 4 which is adjusted against the upper end of the shaft 23 to positively limit the angle of said shaft and wheel 24 against the tension of the band saw 14 on said wheel. An arm 27 is secured to and depends from the beam 2 and carries a screw 28 in its lower end, which screw engages the support 4 for adjusting said support along said beam. An extensible housing 30 encloses the wheels 11 and 24 and the saw 14, which housing is suspended on hangers 31 and 32, the hanger 31 being connected to an arm 33 secured on the beam 2 near the support 3 and the hanger 32 being connected to the support 4. A handle 35 is provided on the upper end of the beam 2 for swinging down the saw and a switch 36 is mounted on the inside of said handle, which switch controls the motor circuits. The motor support 5 is pivoted on the upper end of a post 37 which is turnably mounted in a socket 38 secured on the meat block 40, whereby the saw is mounted to swing in a vertical and in a horizontal plane. The position of the wheel support 3 places the band wheel 11 in such position that the saw 14 will not engage and cut the corner of the block 40 when the device is swung down upon the block. The weight of the motor 6 normally holds the saw up at an angle from the block.

The wheels 11 and 24 are conical and have upper external flanges 41 and 42 respectively. The wheel shafts 10 and 23 are adjusted at an angle towards each other to hold the saw 14 on the wheels.

Having described my invention, I claim:

A motor meat saw including a frame mounted to swing in a vertical and a horizontal plane on the edge of a meat block, two wheel supports on said frame, sprockets on said supports, a motor at one end of said frame for normally holding the frame at an angle above said meat block, one of said wheel supports being mounted on the frame near the swinging end of the frame, the other wheel support being mounted on the frame near the motor but on the side of the frame pivot opposite said motor, a band saw extending over said sprockets, and means whereby the latter wheel is driven by said motor.

In testimony whereof I affix my signature.

WILLIAM L. BROOKE.